(12) United States Patent
Anderson et al.

(10) Patent No.: US 11,716,416 B2
(45) Date of Patent: Aug. 1, 2023

(54) RECORDING GAP DETECTION AND REMEDIATION

(71) Applicant: Zoom Video Communications, Inc., San Jose, CA (US)

(72) Inventors: Walter F. C. Anderson, Santa Cruz, CA (US); Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 160 days.

(21) Appl. No.: 17/244,240

(22) Filed: Apr. 29, 2021

(65) Prior Publication Data

US 2022/0353365 A1 Nov. 3, 2022

(51) Int. Cl.
*H04M 3/42* (2006.01)
*G06F 40/35* (2020.01)
*G10L 15/26* (2006.01)
*H04M 3/56* (2006.01)

(52) U.S. Cl.
CPC ........ *H04M 3/42221* (2013.01); *G06F 40/35* (2020.01); *G10L 15/26* (2013.01); *H04M 3/568* (2013.01)

(58) Field of Classification Search
CPC ... H04M 3/42221; H04M 3/568; G06F 40/35; G10L 15/26
See application file for complete search history.

(56) References Cited

U.S. PATENT DOCUMENTS

| 5,533,103 | A  | * | 7/1996  | Peavey ............... H04M 3/5158 379/85 |
| 6,246,752 | B1 | * | 6/2001  | Bscheider .............. G11B 31/00 |
| 7,389,107 | B1 | * | 6/2008  | Satapathy ............. H04M 1/656 455/437 |
| 8,300,632 | B2 | * | 10/2012 | Davis ..................... H04L 43/00 370/352 |
| 9,178,989 | B2 |   | 11/2015 | Filonov et al. |
| 9,294,615 | B2 |   | 3/2016  | Lum et al. |
| 9,843,672 | B1 | * | 12/2017 | Agrawal .......... H04M 1/72436 |
| 9,894,105 | B2 |   | 2/2018  | Seetharaman et al. |
| 10,516,777 | B1 | * | 12/2019 | Kalkundrikar ...... H04M 3/2227 |
| 11,146,517 | B2 | * | 10/2021 | McCarthy-Howe ........................ H04L 51/214 |
| 11,582,419 | B2 | * | 2/2023  | Barzuza ................ H04W 4/023 |
| 2022/0141329 | A1 | * | 5/2022  | Christie ............ H04M 1/72436 455/412.2 |

(Continued)

*Primary Examiner* — Lisa Hashem
(74) *Attorney, Agent, or Firm* — Young Basile Hanlon & MacFarlane, P.C.

(57) ABSTRACT

A disconnection of a client device is disconnected during a multi-participant communication, such as a call or a conference. An indication of the disconnection is transmitted to the client device to cause an agent at the client device to record media locally at the client device. The media recorded by the agent at the client device based on the indication of the disconnection is later received and included within a recording of the communication. For example, a gap of the recording in which the disconnection occurred may be identified, such as by performing a comparison of media within the recording to identify a start time of the gap and an end time of the gap. The media is then inserted within a portion of the recording of the multi-participant communication corresponding to the gap.

20 Claims, 9 Drawing Sheets

(56) References Cited

U.S. PATENT DOCUMENTS

2022/0201456 A1\* 6/2022 Chiang ................ H04W 76/50
2022/0417183 A1\* 12/2022 Yao ...................... H04W 88/02

\* cited by examiner

US 11,716,416 B2

RECORDING GAP DETECTION AND REMEDIATION

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for recording gap detection and remediation.

One aspect of this disclosure is a method. The method includes detecting a disconnection of a client device from a multi-participant communication, transmitting an indication of the disconnection to the client device, receiving media recorded by an agent at the client device based on the indication of the disconnection, and including the media within a recording of the multi-participant communication.

Another aspect of this disclosure is an apparatus. The apparatus includes a memory and a processor configured to execute instructions stored in the memory to receive media recorded at a device based on an indication that the device has disconnected from a multi-participant communication, identify a gap in which the disconnection occurred within a recording of the multi-participant communication, and include the media within the gap of the recording of the multi-participant communication.

Yet another aspect of this disclosure is a non-transitory computer readable storage device. The non-transitory computer readable storage device includes instructions that, when executed by a processor, cause the processor to perform operations including identifying a gap in which a disconnection of a client device from a multi-participant communication occurred within a recording of the multi-participant communication, and including media recorded at the client device within the gap of the recording of the multi-participant communication.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
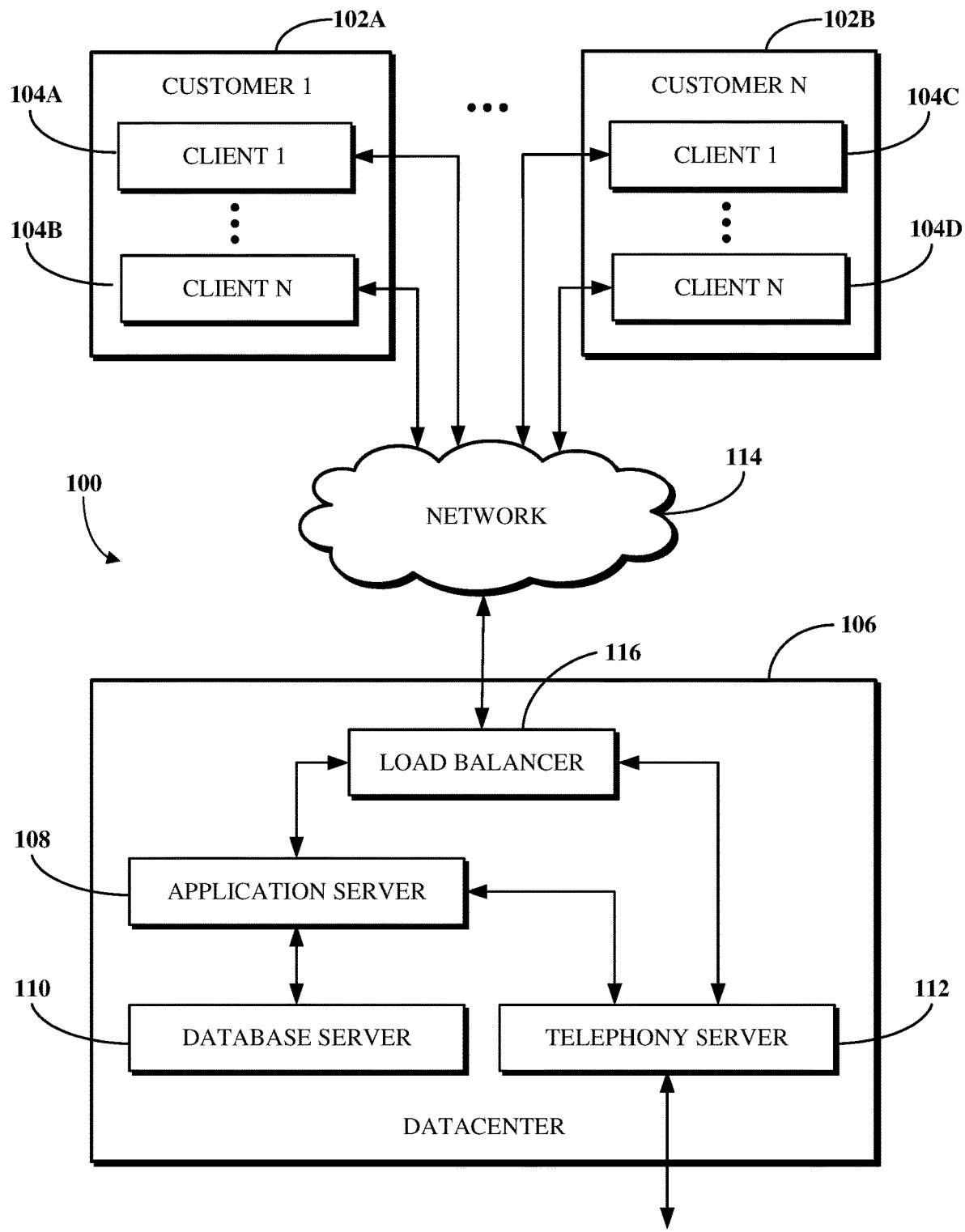
FIG. 1 is a block diagram of an example of an electronic computing and communications system.

At some point during a communication between two or more participants, such as a call or a conference, one of the participants may intentionally or unintentionally disconnect from the communication for some amount of time. For example, the participant may intentionally disconnect from the communication so that he or she may shortly reconnect to the communication using a different device or modality (e.g., by switching from a computer to a mobile phone, by switching from using a telephony connection to using a software connection, or the like). In another example, the participant may unintentionally disconnect from the communication due to user error or due to network issues which limit or prevent media from being transmitted from his or her device to the server implementing the call.

In either case, where the communication is being recorded, the disconnection of a participant from a communication creates a gap in a recording of the communication since the server does not know what is being said by the subject participant during the time in which he or she remains disconnected. This may create issues, in particular, in situations in which reliance is placed on the recording of the communication to represent the discussion between the participants. That is, where there is a gap in the recording of a communication, a given participant to the communication cannot be completely certain of anything spoken by one or more other participants during that gap. Furthermore, this may result in disputes arising from disagreements based on what one participant alleges he or she said, what other participants heard, and what the server implementing the communication detected.

One approach to this problem includes enabling sharing of captured communication media after a participant disconnection occurs, such as after the call has ended. That is, a participant who remained connected to the call while another participant was disconnected may choose to share a recording of the communication with that other participant so he or she can understand what the server did not hear them say during the gap. However, this approach fails to actually capture anything spoken by that disconnected user during the gap and thus cannot yield a true representation of the communication conversation during the gap. Thus, there remains a need for a system which captures communication media at a device of a disconnected user and transmits that captured media for insertion in a recording of the communication.

Implementations of this disclosure address problems such as these by detecting a gap in media of a client device during a multi-participant communication, such as a call implemented over a telephony service or a conference implemented over a conferencing service, and remediating the gap using data captured by a local agent at the client device. A disconnection of the client device from a multi-participant communication is detected. An indication of the disconnection is transmitted to the client device to cause an agent at the client device to record media locally at the client device or to otherwise request media recorded locally at the client device, such as where the media is continuously recorded during the multi-participant communication and not based on the disconnection of the client device from the multi-participant communication. The media recorded by the agent at the client device based on the indication of the disconnection is later received and inserted within a recording of the multi-participant communication. For example, a gap of the recording in which the disconnection occurred may be identified, such as by performing a comparison of media within the recording to identify a start time of the gap and an end time of the gap. The media is then included within a portion of the recording of the multi-participant communication corresponding to the gap.

In one example use case, a call may be established between a caller using a client device and a contact center agent. In some cases, the caller may be associated with a customer of a software platform which implements or otherwise uses the contact center. At some point during the call, the caller may accidentally become disconnected from the call, such as due to network issues or user error. The disconnection causes a local agent associated with a client application running at the client device to begin recording media using one or more sensor inputs of the client device, such as one or more microphones of the client device. The caller may either then call back to the contact center or receive a call back from the contact center to reconnect to the call. Upon the caller reconnecting to the call, the local agent may cease recording the media. The client application may then, during the call or after the call has eventually ended, transmit that locally recorded media to a server which inserts the locally recorded media into a recording of the call.

In another example use case, a call or conference may be established between two or more participants. At some time during the call or conference, one of those participants may disconnect from the call or conference, such as due to network issues, due to user error, or to reconnect to the call or conference using a different modality. The disconnection causes a local agent running at the device of that participant to begin recording media using one or more sensor inputs, which may include one or more microphones, one or more cameras, one or more other sensors, or a combination thereof. Where the participant disconnected to reconnect over a different modality, the participant may so reconnect such as by calling in using a different telephone number available at the device where the communication being reconnected to is a call or by switching from call audio to a conferencing audio and video stream where the communication being reconnected to is a conference. Upon the caller reconnecting to the call or conference, the agent may cease recording the media. The device may then, during the call or conference or after same has eventually ended, transmit that locally recorded media to a server which inserts the locally recorded media into a recording of the call or conference.

To describe some implementations in greater detail, reference is first made to examples of hardware and software structures used to implement a system for recording gap detection and remediation. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
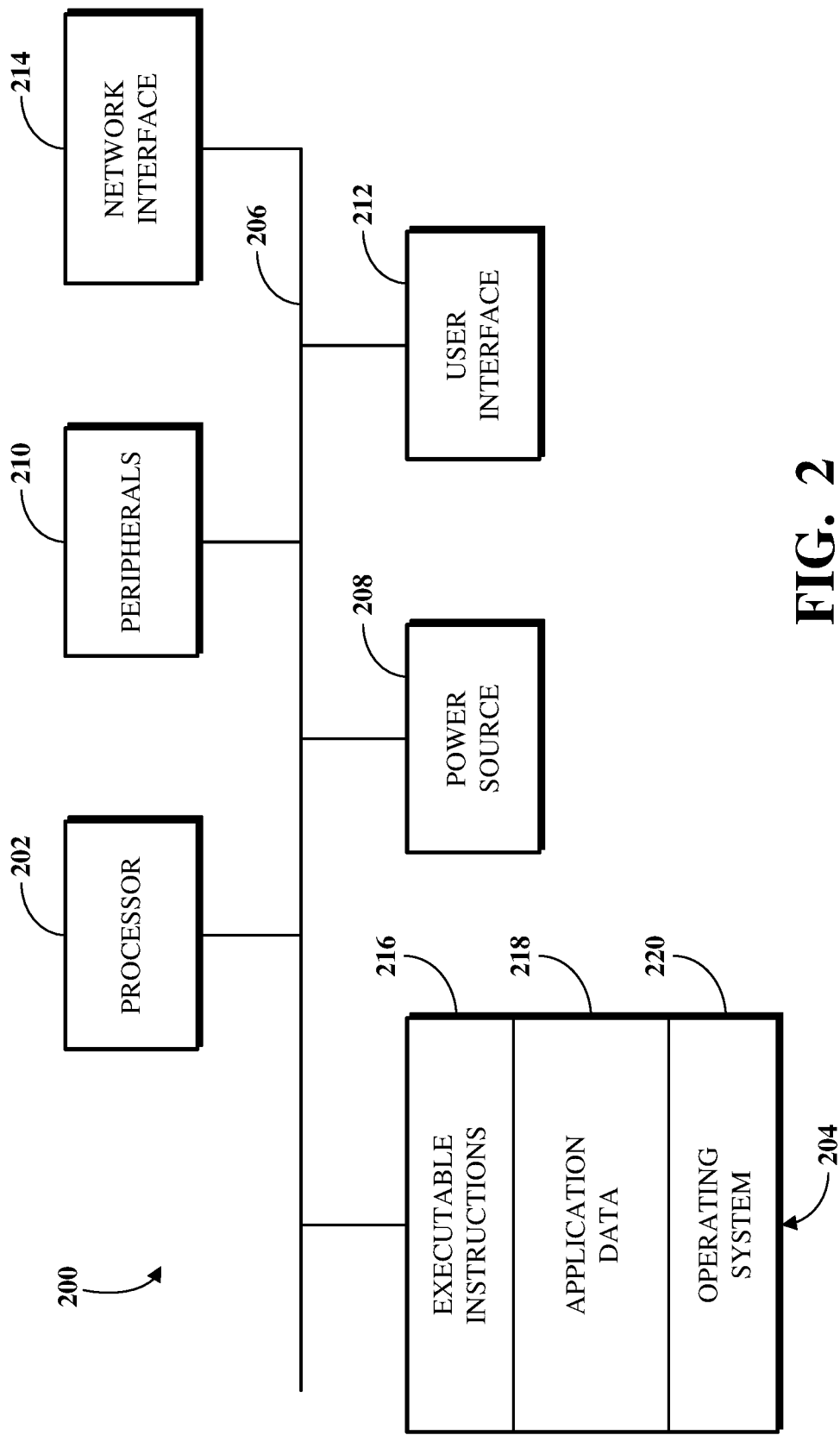
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
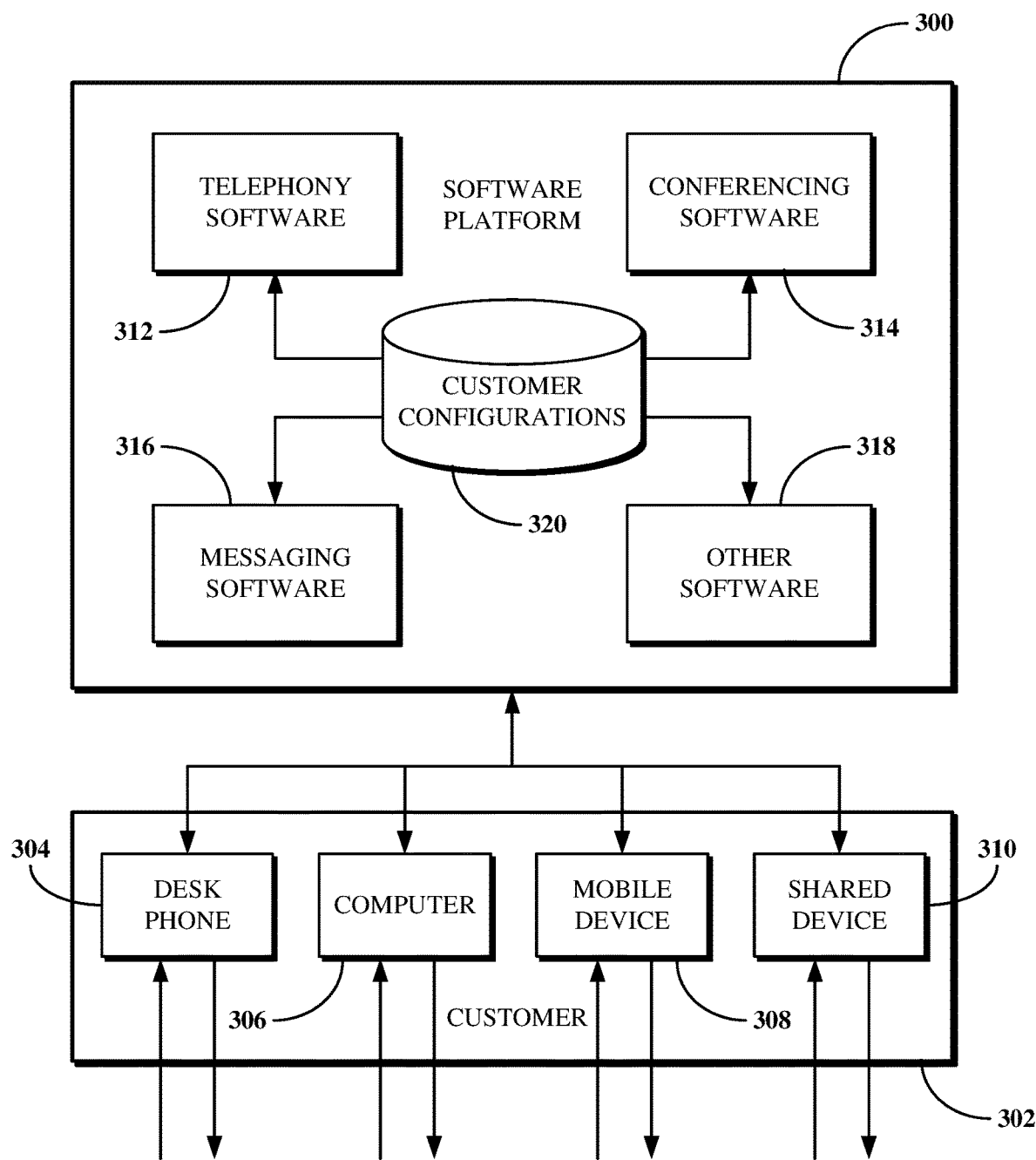
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for detecting a gap in media of a client device during a call and remediating the gap using data captured by a local agent at the client device.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
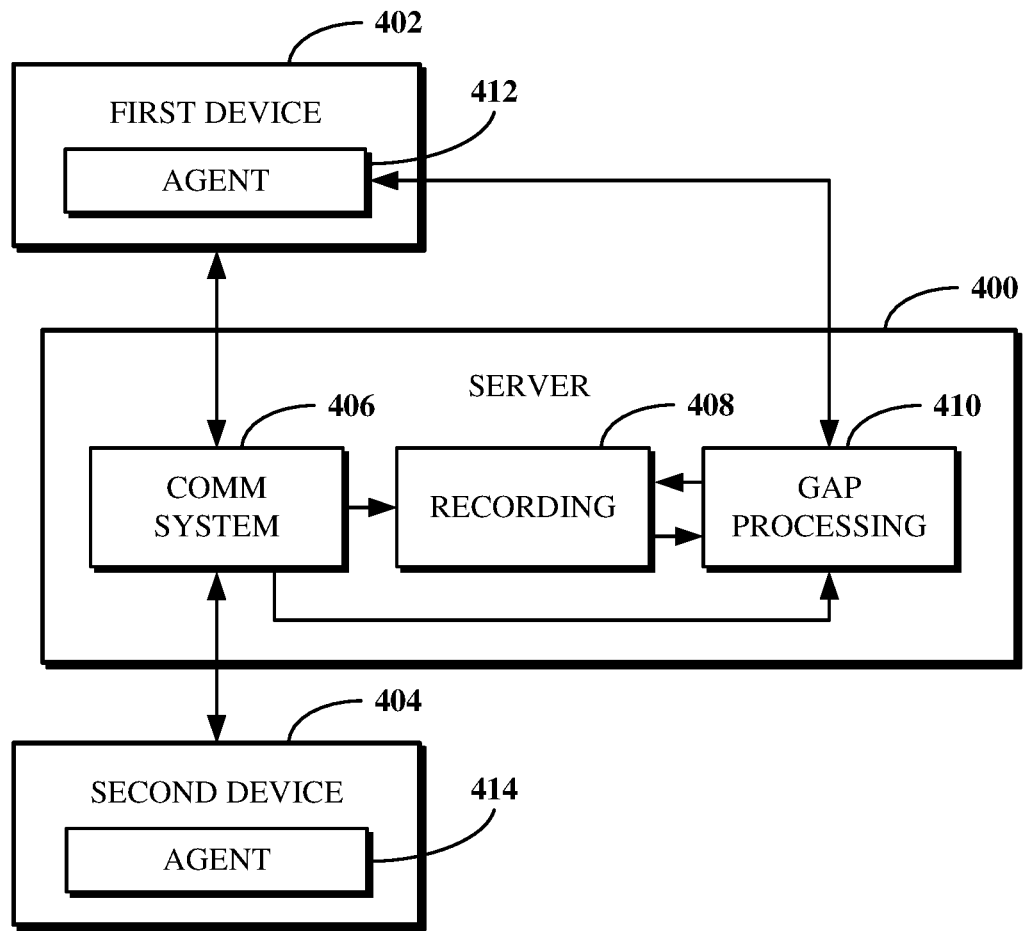
FIG. 4 is a block diagram of an example of a system for recording gap detection and remediation.

FIG. 4 is a block diagram of an example of a system for recording gap detection and remediation. The system includes a server 400 intermediate to a first device 402 and a second device 404. The first device 402 and the second device 404 connect through the server 400 to participate in a multi-participant communication. The server 400 includes a communication system 406, recording software 408, and gap processing software 410.

The communication system 406 includes hardware and/or software used to implement a communication service, for example, a telephony service, a conferencing service, or another communication service. For example, where the communication service is a telephony service, the communication system 406 may include the telephony server 112 shown in FIG. 1 and/or the telephony software 312 shown in FIG. 3. In another example, where the communication service is a conferencing service, the communication system 406 may include the application server 108 shown in FIG. 1 and/or the conferencing software 314 shown in FIG. 3.

The recording software 408 is software which receives media of a multi-participant communication implemented using the communication system 406 and generates a record of the multi-participant communication using same. In some implementations, the recording software 408 may be included within the communication system 406.

The gap processing software 410 is software which detects a gap in a recording of the multi-participant communication and remediates that gap by including media recorded at a device which disconnected from the multi-participant communication to result in that gap. The gap is a period of time within the recording of the multi-participant communication in which media is not available from a device because the device disconnected from the multi-participant communication, either temporarily or for the remainder of the multi-participant communication.

The devices connected to the multi-participant communication include agents. For example, the first device 402 includes an agent 412 and the second device 404 includes an agent 414. The agent is a software aspect which is configured to record media using one or more sensor inputs of the subject device, for example, one or more microphones, one or more cameras, one or more other sensors, or a combination thereof. The agent may, for example, represent an aspect of a client application running at the subject device. For example, the agent may be associated with a software platform which includes the communication system 406, for example, the software platform 300 shown in FIG. 3. In some implementations, the agent may instead be third party software running at the subject device. For example, the agent may be locally implemented at the subject device or implemented remotely, such as over a network.

In some cases, an agent may continuously record media at the device while a multi-participant communication remains in progress. For example, the multi-participant communication may be considered to remain in progress while the device of at least one participant remains connected to the multi-participant communication. In other cases, an agent may record media at the device in response to the disconnection of the device from the multi-participant communication. For example, an indication that the device has disconnected from the multi-participant communication can be transmitted from the server 400, such as using the gap processing software 410 or another aspect at the server 400, to the subject device to cause the agent thereof to begin recording. In such a case, the agent continues recording until either the device reconnects to the multi-participant conference or the multi-participant conference ends.

In the example shown, the first device 402 and the second device 404 are connected to a multi-participant communication implemented using the communication system 406. During the multi-participant communication, the first device 402 disconnects. Based on the disconnection, for example, based on an indication of the disconnection being transmitted to the first device 402 or otherwise, media recorded at the first device 402 while the first device 402 remained disconnected from the multi-participant communication is received at the server 400, for example, using the gap processing software 410. The agent 412 may, for example, write the media in local memory at the first device 402 at it is being recorded at the first device 402. The media may then be removed from the local memory after it is transmitted to the server 400. The gap processing software 410 then identifies a gap in a recording of the multi-participant communication generated, for example, using the recording software 408, and includes the media received from the first device 402 within the gap in the recording of the multi-participant communication.

In some implementations, a first gap may be remediated using media recorded at the first device 402 and a second gap may be remediated using media recorded at the second device 404. For example, the first device 402 and the second device 404 may disconnect from the multi-participant communication at the same time or at different times. In either case, the agent 412 records media at the first device 402 while the first device 402 remains disconnected from the multi-participant communication or until the multi-participant communication ends, and the agent 414 records media at the second device 404 while the second device 404 remains disconnected from the multi-participant communication or until the multi-participant communication ends.

In some implementations, an operator of a device may intentionally disconnect from the multi-participant communication and then reconnect to the multi-participant communication using a different device. For example, the operator of the first device 402 may disconnect from the multi-participant communication so that he or she can reconnect to and continue a conversation of the multi-participant communication and another device accessible to that same operator. For example, the first device 402 may be a mobile phone and the operator of the first device 402 may want to switch over to a desktop computer or laptop computer to continue participating in the multi-participant communication. Each device used by the operator may have its own agent in which the agent of each such device records media at that device until the operator reconnects to the multi-participant communication using the different device. The gap processing software 410 may receive the media recorded at each such device, identify gaps in the recording of the multi-participant communication to which each of the recorded media correspond, and include those recorded media in those respective gaps.

In some such implementations, the client application at the first device 402 may transmit the instructions to the client application at the other device in response to a determination that such other device is pre-authenticated for use by the operator of the first device 402. For example, a client application at the first device 402 may access a record associated with the operator to identify devices on which the operator has previously logged into an account associated with the client application. The client application at the first device 402 may then identify another such device and transmit instructions configured to cause a client application at that device, using an agent at that device, to begin recording media at that device.

In some such implementations, the client application at the first device 402 may transmit the instructions to the client application at the other device in response to a determination that the first device 402 is within a threshold proximity of that other device. For example, rather than allowing an agent of any device authenticated for use by the operator to begin recording media upon the disconnection of the first device 402 from the multi-participant communication, an agent of another device may be configured to begin recording media thereat where that other device is nearby enough to the first device 402. For example, the threshold proximity may be a radial value having a default value or otherwise defined by the operator of the first device 402, a software platform customer with which the operator of the first device 402 is associated, or another entity.

In other such implementations, the client application at the first device 402 may transmit the instructions to the client application at the other device in response to a selection of that other device by the operator at the first device 402. For example, the client application include functionality for allowing an operator of the first device 402 to specify another device at which he or she will reconnect to the multi-participant communication. Instructions for causing an agent at that other device, such as via a client application at that other device, to begin recording media that that other device may thus be transmitted to that other device in response to a selection of that other device within the client application at the first device 402.

In some implementations, the communication system 406, the recording software 408, and the gap processing software 410 may be implemented across more than one server. For example, a first server (e.g., the server 400 or another server) may implement the communication system 406 and the recording software 408 and a second server (e.g., the server 400 or another server) may implement the gap processing software 410. In another example, a first server may implement the communication system 406 and a second server may implement the recording software 408 and the gap processing software 410. In yet another example, a first server may implement the communication system 406 and the gap processing software 410 and a second server may implement the recording software 408. In still another example, a first server may implement the communication system 406, a second server may implement the recording software 408, and a third server (e.g., the server 400 or another server) may implement the gap processing software 410.

In some implementations, each device connected to the communication system 406 may locally record media throughout the entire multi-participant communication and not just during a period in which respective devices disconnect from the communication system 406. Upon the multi-participant communication ending, such as which may be indicated to the respective devices using notifications transmitted from the communication system 406 or by the devices detecting that they have disconnected from the communication system 406, agents at the devices may automatically transmit the local media recordings at the devices to the server 400 for compilation and/or authentication by the gap processing software 410. For example, the gap processing software 410 may overlap the recorded media to verify that the entire multi-participant communication is captured before discarded individual recordings. Where some portion of the media of the multi-participant communication is present in only one such recording, the gap processing software 410 may generate a record, such as within a master merge file for the multi-participant communication, indicating the source of that recording.

Figure 5:
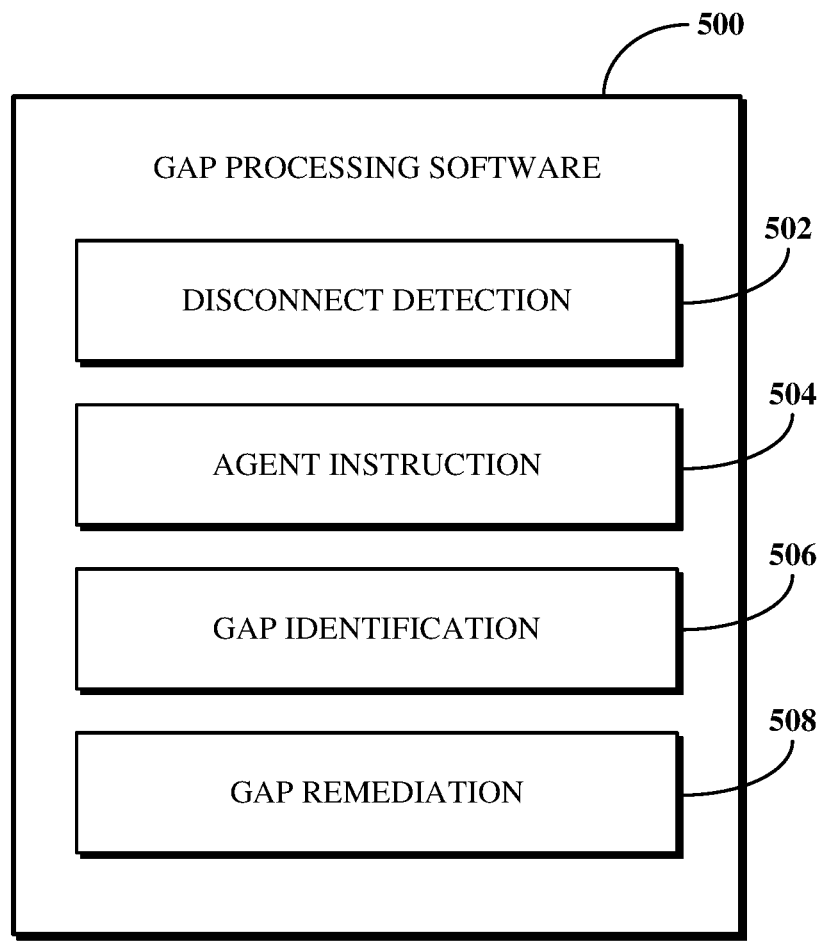
FIG. 5 is a block diagram of example functionality of gap processing software used for recording gap detection and remediation.

FIG. 5 is a block diagram of example functionality of gap processing software 500 used for recording gap detection and remediation. The gap processing software 500 may, for example, be the gap processing software 410 shown in FIG. 4. The gap processing software 500 includes a disconnect detection tool 502, an agent instruction tool 504, a gap identification tool 506, and a gap remediation tool 508.

The disconnect detection tool 502 detects that a device has disconnected from a multi-participant communication. The disconnect detection tool 502 may detect the disconnection based on a channel being closed between the device and the communication system implementing the multi-participant communication. For example, the disconnection may be detected based on an indication received from the communication system that the channel with the device has closed. In some implementations, the disconnect detection tool 502 may attempt to ping the device to verify the disconnection.

The agent instruction tool 504 causes an agent at the disconnected device to record media locally at that device. The agent instruction tool 504 may be configured to interface with the agent, such as via a client application at the device or otherwise, to transmit an indication of the disconnection of the device from the multi-participant communication to the agent to cause the agent to begin locally recording media at the device and/or to retrieve media locally recorded at the device by the agent.

The gap identification tool 506 identifies a gap within a recording of the multi-participant communication. The gap identification tool 506 identifies the gap based on a comparison of the media recorded at the device against at least a portion of the recording of the multi-participant communication. For example, the gap identification tool 506 may compare transcriptions of the recording of the multi-participant communication and of the media recorded at the device to determine where text of those transcriptions do not align. Alternatively, the gap identification tool 506 may identify the gap based on scores determined for the media recorded at the device and for at least a portion of the recording of the multi-participant communication. For example, the gap identification tool 506 identify a portion of the recordings which do not align based on a difference in the determined scores. In either case, the gap identification tool 506 may thereafter identify timestamps of the recording of the multi-participant communication indicating a start time and an end time of the gap.

The gap remediation tool 508 remediates the identified gap within the recording of the multi-participant communication using the media recorded by the agent that the device. In particular, the gap remediation tool 508 includes at least a portion of the media recorded at the device within the recording of the multi-participant communication by inserting that portion or more of the media recorded at the device within the gap identified in the recording of the multi-participant communication.

In some implementations, the gap processing software 500 may include other tools in addition to and/or instead of the tools 502 through 508. Although the tools 502 through 508 are shown as functionality of the gap processing software 500 as a single piece of software, in some implementations, some or all of the tools 502 through 508 may exist outside of the gap processing software 500 and/or the software platform may exclude the gap processing software 500 while still including the some or all of tools 502 through 508 in some form elsewhere.

Figure 6:
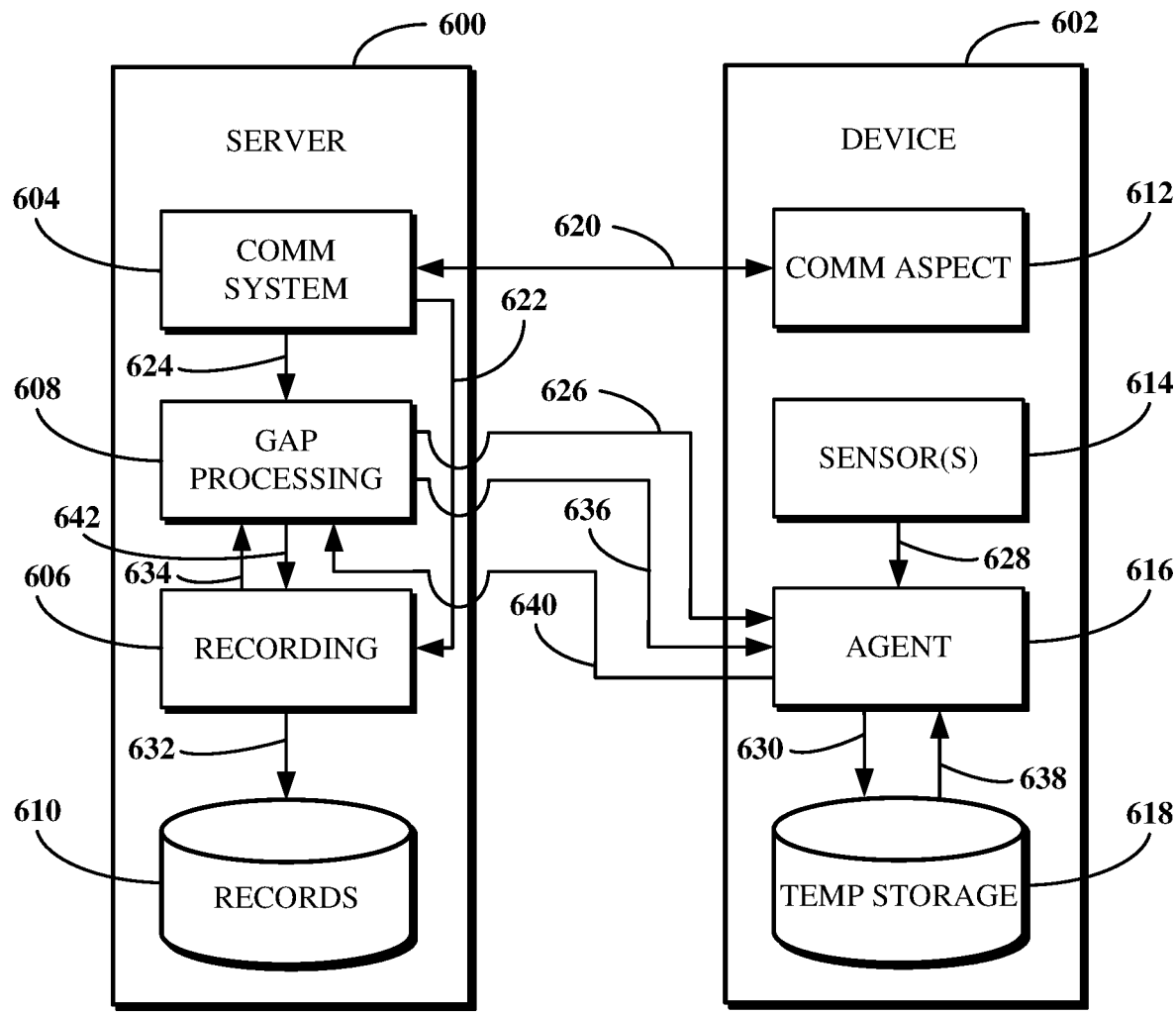
FIG. 6 is a block diagram of an example of exchanges between a server and a device for recording gap detection and remediation.

FIG. 6 is a block diagram of an example of exchanges between a server 600 and a device 602 for recording gap detection and remediation. The server 600 and the device 602 may, for example, be the server 400 and the first device 402 shown in FIG. 4. The server 600 includes a communication system 604, recording software 606, gap processing software 608, and a records data store 610. For example, the communication system 604, the recording software 606, and the gap processing software 608 may respectively be the communication system 406, the recording software 408, and the gap processing software 410 shown in FIG. 4. The device includes a communication aspect 612, one or more sensors 614, an agent 616, and a temporary storage 618. For example, the agent 616 may be the agent 412 shown in FIG. 4.

The communication system 604 implements a multi-participant communication to which the device 602 connects over a channel 620. In one example, the multi-participant communication is a call, the communication system 604 is a telephony system, and the channel 620 is a telephony channel in which case the communication aspect 612 is a phone component of the device 602. In another example, the multi-participant communication is a conference, the communication system 604 is a conferencing system, and the channel 620 is a conferencing channel in which case the communication aspect 612 is a conferencing component, such as of a client application. In either case, after the multi-participant communication has started, or at the start thereof, the communication system 604 transmits a command 622 to the recording tool 606 to record the multi-participant communication.

At some point during the multi-participant communication, the device 602 stops sending information to the communication system 604. For example, the channel 620 may close, such as based on a disconnection of the device 602 to the server 600, which, more specifically, may be a disconnection of the communication aspect 612 to the communication system 604. In response thereto, the communication system 604 sends a notification 624 to the gap processing software 608. The gap processing software 608 uses the notification 624 to detect that the device 602 has disconnected from the multi-participant communication. Alternatively, the notification 624 may be an indication that the communication system 604 has detected that the device 602 has disconnected from the multi-participant communication.

In either case, in response to the notification 624, the gap processing software 608 transmits an indication 626 of the disconnection to the agent 616. The indication 626 causes the agent 616 to begin recording media locally at the device 602 in response to the indication 626. In particular, the agent 616 receives data 628 captured using the one or more sensors 614 of the device 602 and generates a recording of media at the device 602 based on the data 628. The agent 626 may continue to receive the data 628 until the channel 620 is reopened or a new channel is opened between the communication aspect 612 and the communication system 604 such that the device 602 has reconnected to the multi-participant conference. The agent 616 thereafter transmits a request 630 to store the recording in the temporary storage 618, which may, for example, be a local memory buffer or other local memory aspect.

Alternatively, the agent 616 may continuously record media locally at the device 602. For example, the communication aspect 612 may transmit a command (not shown) to the agent 616 to begin recording media at the device 602 in response to the channel 620 being opened. The agent 616 may continue recording the media for a definite period of time or until some event occurs, for example, an indication that the multi-participant conference has ended, user input at the device 602 requesting that the media stop being recorded, or the like. The indication 626 may thus be transmitted to the agent 616 to cause the agent to transmit media recorded at the device 602 to the server 600. In some implementations, a rolling window (e.g., 30 seconds long, 60 seconds long, or of another length) of the media recorded by the agent 616 may be stored in the temporary storage 618 at the device 602. For example, data can be evicted from the local memory after a new set of media for a new window has been recorded. The indication 626, upon receipt from the server 600, may cause the agent 616 to store the media in local memory at the device 602 beyond the rolling window so as to not delete it before it is later transmitted to the server 600. In some implementations, the indication 626 may be omitted.

At some point after the agent 616 begins recording the media locally at the device 602, the multi-participant communication ends, and the recording software 606 generates a recording 632 of the multi-participant communication. The recording software 606 records media of the multi-participant communication in real-time during the multi-participant communication, so partial records of the multi-participant communication may exist in real-time with the progression of the multi-participant communication. The recording software 606 then transmits a request 632 to store the recording of the multi-participant communication within the records data store 610. The recording software 606 then transmits a notification 634 to the gap processing software 608 to indicate that the recording of the multi-participant communication has been generated.

In response to the notification 634, the gap processing software 606 transmits a request 636 for media recorded at the device 602, such as by the agent 616 during the period in which the device 602 was disconnected from the multi-participant communication. The agent 616 uses a request 638 to retrieve the media recorded at the device 606 from the temporary storage 618. The agent 616 then transmits a signal 640 including the retrieved media to the server 600, such as to the gap processing software 608. The media recorded at the device 602 is thus transmitted to the server 600 regardless of whether or not the device 602 ultimately reconnected to the multi-participant communication.

The gap processing software 608 processes the media recorded at and retrieved from the device 602 against the recording of the multi-participant communication to identify a gap within the multi-participant communication during which the device 602 was disconnected from the server 600. For example, the gap processing software 608 may perform a comparison of recording media, that is, media within the recording of the multi-participant communication, against the media recorded at and retrieved from the device 602 to identify a start time of the gap and an end time of the gap.

The gap processing software 608 then transmits a request 642 for the retrieved media to be included in the recording of the multi-participant communication by inserting said media within the gap identified within the recording of the multi-participant communication. Finally, the recording software 606, in response to the request 642, causes an update 644 to the recording of the multi-participant communication to cause the media recorded at and retrieved from the device 602 to be included within the gap identified within the recording of the multi-participant communication. The updated recording of the multi-participant communication, which includes at least some of the media recorded at the device 602, can then be accessed.

In some implementations, the server 600 can transmit media recorded by the recording software 606 to the device 602. For example, a request can be transmitted from the device 602, such as from the agent 616 or otherwise, to the recording software 606 to transmit some or all of a recording of the multi-participant communication to the device 602. The request may be transmitted after the multi-participant communication ends, in which case the entire recording of the multi-participant communication may be transmitted to the device 602, or during the multi-participant communication, in which case a portion of the real-time recording of the multi-participant communication may be transmitted to the device 602. The request may, for example, be in response to a disconnection of the device 602 from the multi-participant communication. For example, the request may be a request to provide a complete representation of the media recorded during the disconnection period to the operator of the device 602.

In some such implementations in which the request is transmitted during the multi-participant communication, a portion of the real-time recording of the multi-participant communication corresponding to the time period in which the disconnection occurred (e.g., measured based on a start time at which the communication system 604 detected a disconnection of the device 602 to an end time at which the communication system 604 detected a reconnection of the device 602) may be transmitted to the device 602 as part of a catch-up function. For example, the server 600 can transmit that portion of the real-time recording to the device 602 to allow the operator of the device 602 to watch the media recorded during the disconnection period, such as to understand what occurred in the multi-participant communication while the operator was disconnected therefrom. For example, the transmitted media may be set to a catch up playback speed which plays the recorded media for the operator of the device 602 to view in a way that allows him or her to catch up to the conversation of the multi-participant communication shortly after he or she reconnects thereto.

Figure 7:
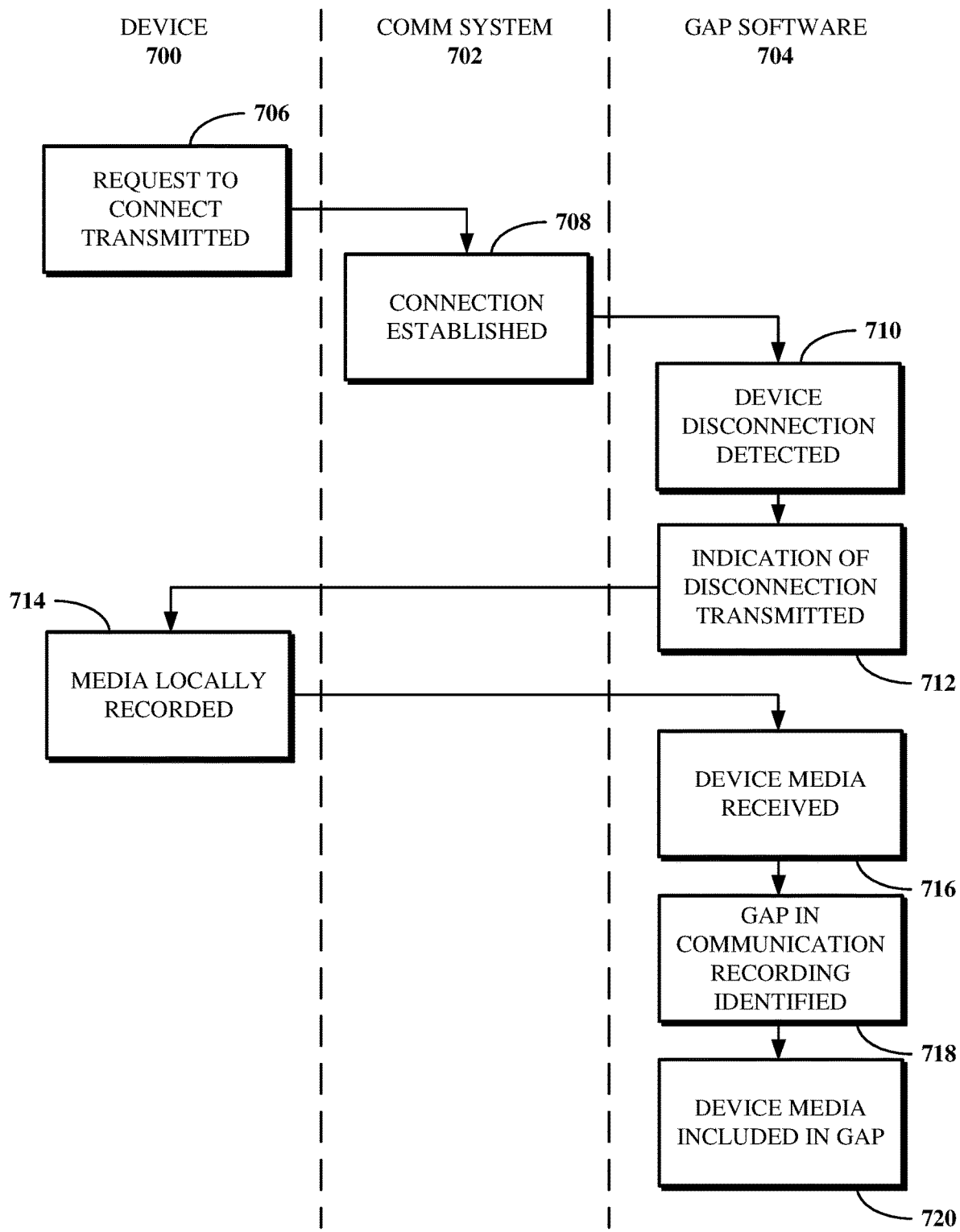
FIG. 7 is an illustration of swim lanes showing a first example sequence of operations performed for recording gap detection and remediation.

FIG. 7 is an illustration of swim lanes showing a first example sequence of operations performed for recording gap detection and remediation. The sequence of operations shown in FIG. 7 are between a device 700, a communication system 702, and gap processing software 704 in which media locally recorded at the device 700 after a disconnection of the device 700 from a multi-participant communication begins based on an indication of the disconnection transmitted, for example, by the gap processing software 704. The device 700, the communication system 702, and the gap processing software 704 may, for example, respectively be the device 602, the communication system 604, and the gap processing software 608 shown in FIG. 6.

First, a request to connect to a multi-participant communication is transmitted 706 from the device 700 to the communication system 702. The connection is established 708, such as by a channel being opened between the device 700 and the communication system 702. At some time later during the multi-participant communication, a disconnection of the device 700 from the multi-participant communication is detected 710 by the gap processing software 704. An indication of the disconnection is then transmitted 712 from the gap processing software 704 to the device 700 to cause media to be locally recorded 714 at the device 700. The media is then received 716 at the gap processing software 704, which then identifies 718 a gap in a recording of the multi-participant communication and includes 720 the media within that gap. In some implementations, the device 700 reconnects to the communication system 702 after the media begins locally recording at the device 700. In such a case, the connection of the device 700 to the communication system 702 may be reestablished and the local recording of the media at the device 700 may stop before the device media is received at the gap processing software 704.

Figure 8:
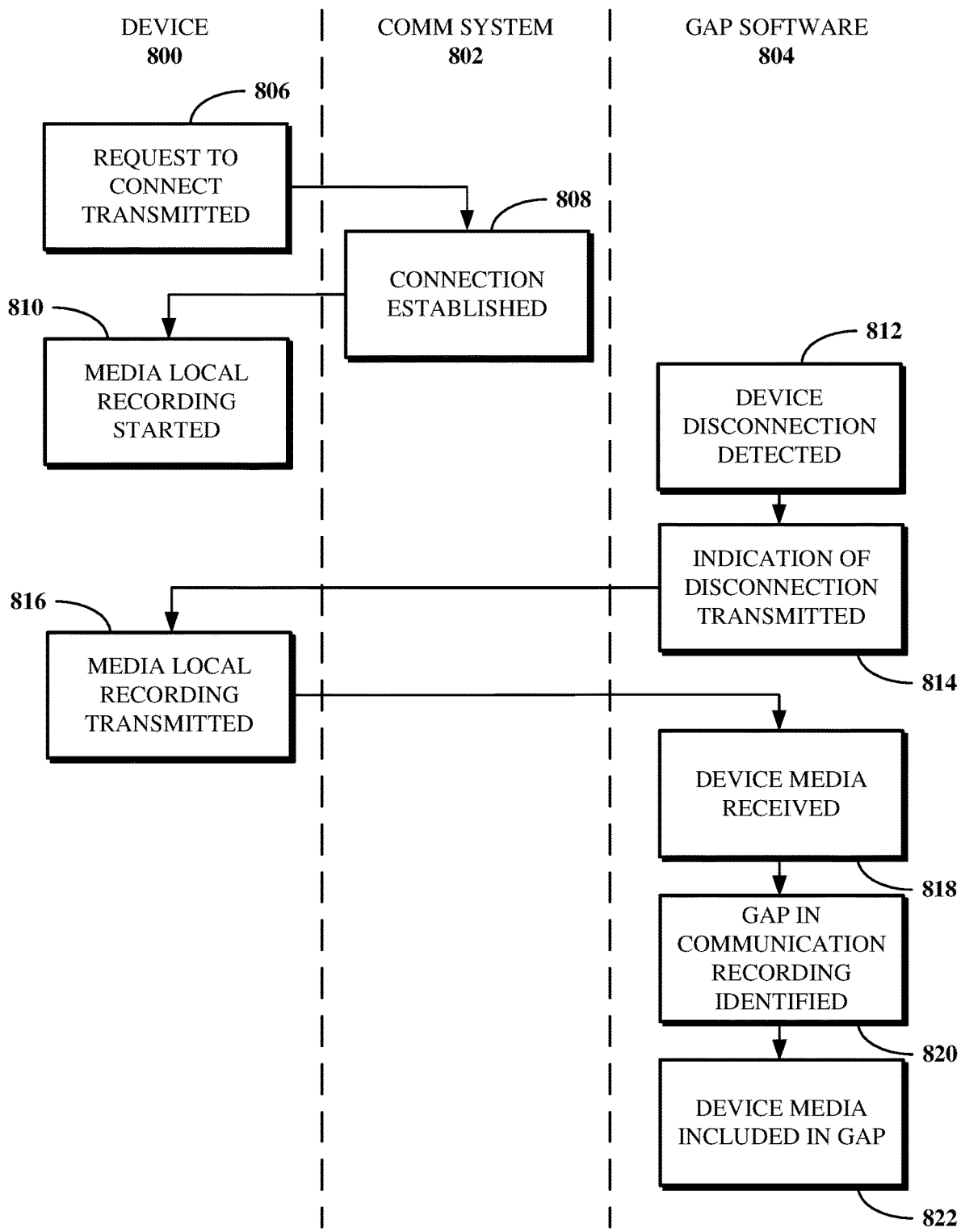
FIG. 8 is an illustration of swim lanes showing a second example sequence of operations performed for recording gap detection and remediation.

FIG. 8 is an illustration of swim lanes showing a second example sequence of operations performed for recording gap detection and remediation. The sequence of operations shown in FIG. 8 are between a device 800, a communication system 802, and gap processing software 804 in which media is locally recorded at the device 800 upon the connection of the device 800 to a multi-participant communication at the communication system 802 begins. The device 800, the communication system 802, and the gap processing software 804 may, for example, respectively be the device 602, the communication system 604, and the gap processing software 608 shown in FIG. 6.

First, a request to connect to a multi-participant communication is transmitted 806 from the device 800 to the communication system 802. The connection is established 708, such as by a channel being opened between the device 800 and the communication system 802. Upon that connection being established local media recording is started 806 at the device 800. At some time later during the multi-participant communication, a disconnection of the device 800 from the multi-participant communication is detected 812 by the gap processing software 804. An indication of the disconnection is then transmitted 814 from the gap processing software 804 to the device 800 to cause the media locally recorded at the device 800 to be transmitted 816 to the gap processing software 804. The media is then received 818 at the gap processing software 804, which then identifies 820 a gap in a recording of the multi-participant communication and includes 822 the media within that gap. In some implementations, the connection of the device 800 to the communication system 802 may be reestablished before the device media is received at the gap processing software 804.

Figure 9:
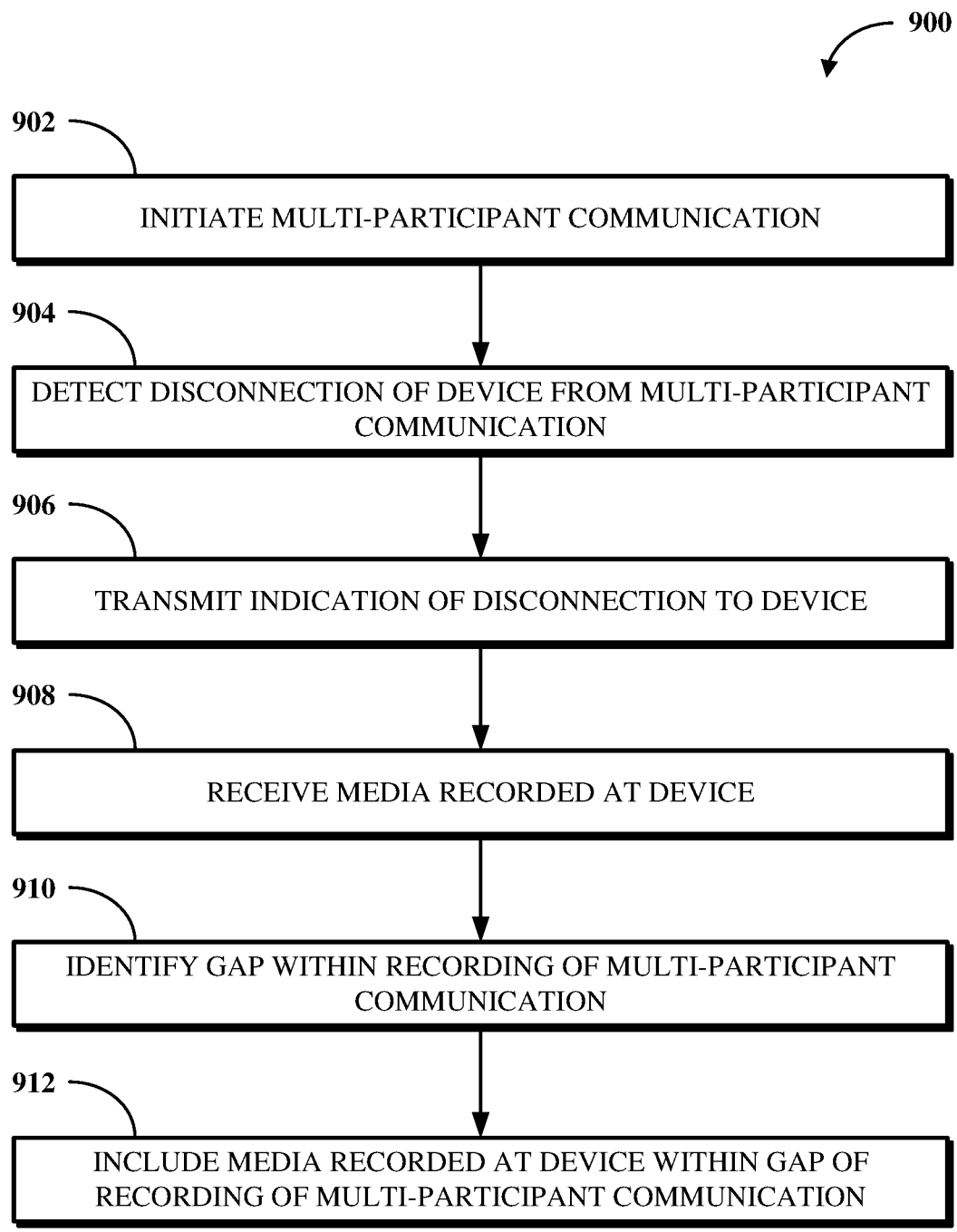
FIG. 9 is a flowchart of an example of a technique for recording gap detection and remediation.

To further describe some implementations in greater detail, reference is next made to examples of techniques for recording gap detection and remediation. FIG. 9 is a flowchart of an example of a technique 900 for recording gap detection and remediation. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a multi-participant communication is initiated. The multi-participant communication may be a call, a conference, or another live communication between two or more participants. The multi-participant communication is implemented using a communication service, which may, for example, be a telephony service or a conferencing service. The communication service may, for example, be a communication service of a software platform. In some cases, each of the participants uses his or her own device to connect to the multi-participant communication. In other cases, two or more of the participants may connect to the multi-participant communication using the same device, and there are at least two devices connected to the multi-participant communication. The devices may be client devices, such as which each run a client application, or devices other than client devices.

At 904, at some point during the multi-participant communication, a disconnection of a device of one of the participants from the multi-participant communication is detected. The disconnection may be intentional, such as by an operator of the device seeking to reconnect to the multi-participant communication over a different modality using a different device. Alternatively, the disconnection may be unintentional, such as due to user error, network issues, or other issues. The disconnection may be detected by a channel between the device and the communication service closing. The detection may be performed by the communication system implementing the communication service or by other server software, for example, software for gap processing as disclosed herein. At 906, an indication of the disconnection of the device is transmitted to the client device.

At 908, media recorded at the device is received. The media is received from the device either after the device reconnects to the multi-participant communication or after the multi-participant communication ends. The media may be recorded by an agent at the device. In some cases, the agent is configured to begin recording the media based on the indication that the device has disconnected from the multi-participant communication and to stop recording the media based on one of an indication that the device has reconnected to the multi-participant communication or an indication that the multi-participant communication has ended. In some cases, the agent is configured to begin recording the media before a start time of the gap and to continue recording the media after an end time of the gap. For example, the agent at the client device may continuously record the media during the multi-participant communication and the indication of the disconnection may cause the media to be transmitted from the client device.

At 910, a gap in which the disconnection of the device occurred is identified within a recording of the multi-participant communication. Identifying the gap in which the disconnection occurred within the recording of the multi-participant communication may include performing a comparison of recording media against the media recorded by the agent at the client device to identify a start time of the gap and an end time of the gap. The comparison includes a comparison between text transcribed based on the recording media and text transcribed based on the media recorded by the agent at the client device. For example, the comparison may be a checksum comparison. Alternatively, the gap in which the disconnection occurred within the recording of the multi-participant communication can be identified by identifying a portion of the recording of the multi-participant communication during which a score determined for the client device is below a threshold the score may, for example, be a low mean opinion score (MOS) or another score. Identifying the gap based on the score may include determining a portion of the recording of the multi-participant communication in which the score changes, such as decreases. The change in score can, for example, be attributed to the disconnection of the device from the multi-participant communication.

At 912, the media recorded at the device is included within a portion of the recording of the multi-participant communication corresponding to the gap. Including the media recorded at the device within the portion of the recording of the multi-participant communication corresponding to the gap includes inserting the media recorded at the device or a portion thereof from a start time of the gap to an end time of the gap within the gap identified in the recording of the multi-participant communication. The included media overlaps existing media within the recording of the multi-participant communication during the gap.

In some implementations, identifying the gap includes authenticating one or more recordings of media associated with the multi-participant communication, in particular, the recording of the multi-participant communication and the media recorded at the device during the disconnection period. For example, in response to identifying the start time and the end time of the gap, the technique 900 may include authenticating the media recorded at the device against the recording of the multi-participant communication based on audio signal information, such as sound energy wave amplitudes, frequencies, and the like, from each of those recordings. For example, the audio signal information of the recording of the multi-participant communication at or around the start time and the end time of the gap can be compared to the audio signal information of the media recorded at the device at or around the start time and the end time of the gap. If there is a match between the audio signal information or the audio signal information is otherwise within some threshold variance indicating a high correlation between the audio signal information notwithstanding the audio signal information not being identical, the technique 900 can proceed; however, if the audio signal information does not match or is otherwise not within the threshold variance, the technique 900 may stop and thus not include the media recorded at the device within a portion of the recording of the multi-participant communication corresponding to the gap.

In some implementations, the technique 900 may omit including the media recorded at the device within the gap in the recording of the multi-participant communication. For example, the technique 900 may include determining a quality level of the media recorded at the device. If the quality level does not meet a quality threshold, the media may not be included in the recording of the multi-participant communication. The quality threshold may, for example, be based on a measured quality level of the recording of the multi-participant communication or otherwise be a default threshold defined for multi-participant communications. In another example, the technique 900 may include determining whether the amount of media meets a time threshold. If the amount of media is of a period of time that does not meet the time threshold, the media may not be included in the recording of the multi-participant communication. For example, if the media is recorded at the device for only a couple of seconds or less, a determination may be made that the value of expending resources to include that media within the recording of the multi-participant conference outweighs the value of having that media be included within the recording of the multi-participant conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    detecting a disconnection of a first client device from a multi-participant communication;
    transmitting an indication of the disconnection to the first client device;
    receiving first media recorded by an agent at the first client device based on the indication of the disconnection; and
    inserting the first media within a recording of the multi-participant communication to cause the recording of the multi-participant communication to include the first media and second media transmitted from one or more second client devices during the multi-participant communication.

2. The method of claim 1, wherein inserting the first media within the recording of the multi-participant communication comprises:

identifying a gap in which the disconnection occurred within the recording of the multi-participant communication; and inserting the first media within a portion of the recording of the multi-participant communication corresponding to the gap.

3. The method of claim 2, wherein identifying the gap in which the disconnection occurred within the recording of the multi-participant communication comprises:

performing a comparison of recording media against the first media recorded by the agent at the first client device to identify a start time of the gap and an end time of the gap, wherein the recording media includes the second media.

4. The method of claim 3, wherein the comparison includes a comparison between text transcribed based on the recording media and text transcribed based on the first media recorded by the agent at the client device.

5. The method of claim 3, wherein the first media recorded by the agent at the client device includes media recorded before the start time of the gap and media recorded after the end time of the gap, and wherein a portion of the first media recorded by the agent at the first client device corresponding to the gap is inserted within the portion of the recording of the multi-participant communication corresponding to the gap.

6. The method of claim 2, wherein identifying the gap in which the disconnection
occurred within the recording of the multi-participant communication comprises:
identifying a portion of the recording of the multi-participant communication during which a score determined for the first client device is below a threshold.

7. The method of claim 1, wherein the indication of the disconnection causes the agent at the first client device to begin recording the first media.

8. The method of claim 1, wherein the agent at the first client device continuously records the first media during the multi-participant communication and the indication of the disconnection causes the first media to be transmitted from the first client device.

9. The method of claim 1, wherein the multi-participant communication is a call and the first media recorded by the agent at the first client device is received after one of the first client device reconnecting to the call or the call ending.

10. The method of claim 1, wherein the multi-participant communication is a conference and the first media recorded by the agent at the first client device is received after one of the first client device reconnecting to the conference or the conference ending.

11. An apparatus, comprising:
a memory; and
a processor configured to execute instructions stored in the memory to:
receive first media recorded at a first device based on an indication that the first device has disconnected from a multi-participant communication;
identify a gap in which the disconnection occurred within a recording of the multi-participant communication that includes second media transmitted from one or more second devices during the multi-participant communication; and
insert the first media within the gap of the recording of the multi-participant communication to cause the recording of the multi-participant communication to include the first media and the second media.

12. The apparatus of claim 11, wherein the processor is configured to execute the instructions to identify the gap in which the disconnection occurred within the recording of the multi-participant communication to:

perform a comparison of recording media against the first media recorded at the device to identify a start time of the gap and an end time of the gap, wherein the recording media includes the second media.

13. The apparatus of claim 12, wherein the comparison includes a comparison between text transcribed based on the recording media and text transcribed based on the first media recorded at the first device.

14. The apparatus of claim 11, wherein the media is recorded by an agent at the
first device.

15. The apparatus of claim 14, wherein the agent is configured to begin recording the first media based on the indication that the first device has disconnected from the multi-participant communication and to stop recording the first media based on one of an indication that the first device has reconnected to the multi-participant communication or an indication that the multi-participant communication has ended.

16. The apparatus of claim 14, wherein the agent is configured to begin recording the first media before a start time of the gap and to continue recording the first media after an end time of the gap.

17. A non-transitory computer readable storage device including program instructions that, when executed by a processor, cause the processor to perform operations, the operations comprising:

identifying a gap in which a disconnection of a first client device from a multi-participant communication occurred within a recording of the multi-participant communication, wherein the recording of the multi-participant communication includes first media transmitted from one or more second client devices during the multi-participant communication; and inserting second media recorded at the first client device within the gap of the recording of the multi-participant communication to cause the recording of the multi-participant communication to include the first media and the second media.

18. The non-transitory computer readable storage device of claim 17, wherein the operations for identifying the gap in which the disconnection occurred within the recording of the multi-participant communication comprises:

performing a comparison of recording media against the second media recorded at the first client device to identify a start time of the gap and an end time of the gap, wherein the recording media includes the first media.

19. The non-transitory computer readable storage device of claim 18, wherein the recording of the second media at the first client device is started before the start time of the gap and is ended after the end time of the gap.

20. The non-transitory computer readable storage device of claim 17, wherein the recording of the second media at the first client device is started in response to the disconnection of the first client device from the multi-participant communication and is ended in response to one of a reconnection of the first client device to the multi-participant communication or an end of the multi-participant communication.

* * * * *